United States Patent [19]

Roberts et al.

[11] Patent Number: 4,610,062

[45] Date of Patent: Sep. 9, 1986

[54] METHOD OF MAKING AN ACOUSTIC MICROPHONE

[75] Inventors: Jon A. Roberts, Minnetonka; Thomas E. Hendrickson, Wayzata, both of Minn.

[73] Assignee: Honeywell Inc., Minneapolis, Minn.

[21] Appl. No.: 647,957

[22] Filed: Sep. 6, 1984

Related U.S. Application Data

[62] Division of Ser. No. 446,290, Dec. 2, 1982, Pat. No. 4,495,385.

[51] Int. Cl.⁴ .............................................. H01G 7/00
[52] U.S. Cl. ..................................... 29/25.41; 29/423
[58] Field of Search ................... 29/25.42, 25.41, 423, 29/424; 179/111 R, 111 E, 121 R; 228/180.2; 361/328

[56] References Cited

U.S. PATENT DOCUMENTS 3,887,760  6/1975  Krieger et al. .................. 228/180.2
3,930,128 12/1975  Fidi et al. ........................ 179/111 R
4,329,779  5/1982  England ............................. 29/840

Primary Examiner—Howard N. Goldberg
Assistant Examiner—P. W. Echols
Attorney, Agent, or Firm—Trevor B. Joike

[57] ABSTRACT

A capacitive acoustic transducer comprises a first field plate mounted to a semiconductor substrate structure, a second metal field plate having first and second oppositely and substantially exposed surfaces, and a mounting arrangement for mounting the second field plate to the semiconductor substrate structure so that the first and second field plates form an acoustically responsive capacitor, the first exposed surface of the second field plate substantially facing the first field plate, the mounting arrangement allowing the second field plate to respond to acoustic energy for altering the capacitance between the first and second field plates, the mounting arrangement including first and second contacts for respective connection to the first and second field plates. The method of fabricating this capacitive acoustic transducer includes the step of forming the second field plate on a disposable support structure, mounting the second field plate on the disposable support structure to the first field plate on the substrate structure and then disposing of the disposable support structure.

10 Claims, 11 Drawing Figures

METHOD OF MAKING AN ACOUSTIC MICROPHONE

This application is a division of application Ser. No. 446,290, filed 12/2/82 now U.S. Pat. No. 4,495,385.

BACKGROUND OF THE INVENTION

The present invention relates to capacitive acoustic microphones and, more particularly, to capacitive acoustic microphones involving a first field plate mounted to a semiconductor substrate structure and a second metal field plate mounted to the semiconductor substrate structure so that the first and second field plates form an acoustically responsive capacitor. The invention also involves the method of fabricating such a capacitor.

Various capacitive microphones have been known in the prior art. Typically, these microphones are either constructed from discrete, non-semiconductor materials which do not lend themselves to semiconductor batch fabrication or constructed by use of semiconductor batch fabrication technology but without the advantages that nontraditional semiconductor fabrication can provide.

In the former case, the diaphragm electrode of the capacitive transducer is mechanically stretched over a void created in a base plate which is typically an insulative base plate such as alumina. A second electrode is then plated to the insulative base plate to form the second plate of the capacitor. The process of making such a transducer is time consuming and cannot take advantage of semiconductor processing which can, as an example, fabricate both the transducer and the electronic signal processing circuitry on the same semiconductor substrate.

In the latter case, where semiconductor batch fabrication techniques are used for making the transducer, both the diaphragm electrode and the stationary fixed electrode are constructed from semiconductor materials. Such arrangements are expensive to construct and do not yield optimum capacitive type transducers.

SUMMARY OF THE INVENTION

The present invention provides a low cost, moderate performance, low power microphone including a first field plate mounted to a semiconductor substrate structure, a second metal field plate having first and second oppositely and substantially exposed surfaces, and a mounting arrangement for mounting the second field plate to the semiconductor substrate structure so that the first and second field plates form an acoustically responsive capacitor, the first exposed surface of the second field plate substantially facing the first field plate, the mounting arrangement allowing the second field plate to respond to acoustic energy for altering the capacitance between the first and second field plates, the mounting arrangement also including first and second contacts for respective connection to the first and second field plates.

The present invention also involves a method of fabricating such a capacitive acoustic microphone including the steps of forming a first field plate on a substrate structure, forming a second field plate on a disposable support structure, providing first and second contacts for respective connection to the first and second field plates, mounting the second field plate and disposable support structure to the substrate structure so that the first and second field plates form an acoustically responsive capacitor, and disposing of the disposable support structure.

BRIEF DESCRIPTION OF THE DRAWINGS

These and other features and advantages will become more apparent from a detailed consideration of the invention when taken in conjunction with the drawings in which.

DETAILED DESCRIPTION

FIGS. 1-9 show the fabrication steps in making a capacitive acoustic transducer according to the present invention.

The transducer shown in FIGS. 1-9 is simplified for explanatory purposes and is shown in more detail in FIGS. 10 and 11 as will be discussed hereinafter. The fabrication sequence as represented by the drawings may, for example, begin after completion of the process steps which integrate CMOS electronic signal processing circuitry on a semiconductor substrate such as substrate 11 shown in FIG. 1. This substrate may be p type silicon, for example. A first field plate 12 is formed on or in substrate 11. Lower field plate 12 can be a metal plate, for example, plated, evaporated or sputtered onto substrate 11 or may be diffused into substrate 11 by any known diffusion process so that first field plate 12 may, for example, be an n+ layer in substrate 11. Lower field plate 12 could also be a polysilicon or other deposited conductive layer.

A dielectric passivation layer such as silicon dioxide, $SiO_2$, is typically formed over substrate 11 but has been omitted to simplify the explanation of the process. Additionally, passivation layer 13, which can be $Si_3N_4$, may also be provided for environmental protection of the CMOS circuitry. This passivation layer 13 may not be essential depending upon the environment in which the transducer is used.

Figure 3:
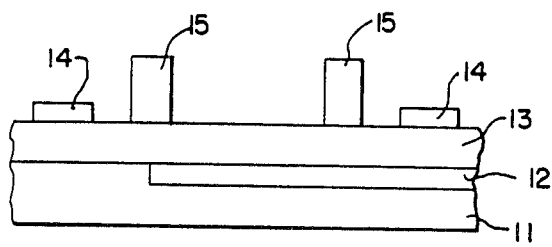
Figure 4:
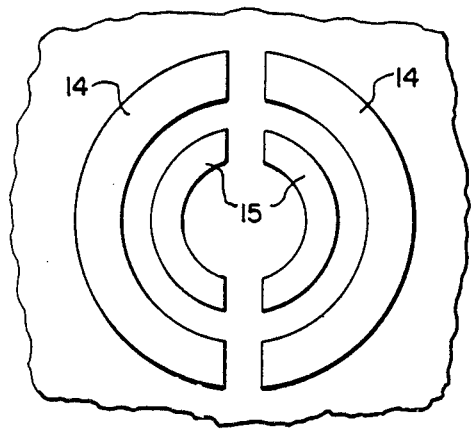

At this point, the wafer, if batch fabrication techniques are used, has contact pads 14, which may be platinum, formed thereon. Then, as shown in FIG. 3, a thick (1-5 mils) layer of dielectric is deposited and patterned to form circular stand-off rings 15. The stand-off rings are designed to provide added support for the diaphragm when it is mounted to this unit. A top view of the transducer portion of the wafer is shown in FIG. 4.

Figure 5:
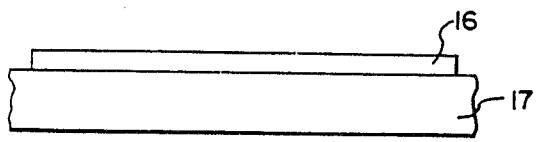
FIGS. 5-7 show the construction of the second field plate forming the diaphragm of the capacitive acoustic microphone.

As shown in FIG. 5, the diaphragm is formed by depositing a thin layer (for example 0.2-2 micrometers) of metal 16 (such as titanium) on a disposable support or substrate 17. This disposable support may be a soluble substrate such as calcium chloride ($CaCl_2$) or other salt which will dissolve in water. Metal layer 16 can be shadow masked and have an interior region 18 which is non-solder wettable metal (such as titanium) and an outer ring 19 of a solder wettable (such as platinum) metal. Solder bumps 20 are then applied to the wettable metal 19. The wettable metal 19 and solder bump 20 may take generally the same geometric form as shown in FIG. 4 so that when the device of FIG. 7 is flipped and applied to the device shown in FIG. 3, solder bumps 20 will overlay the metal pads 14.

Figure 7:
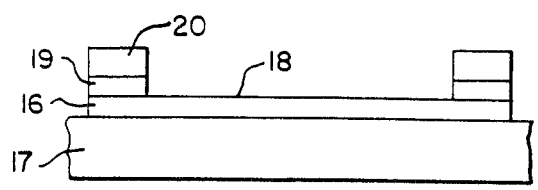
Figure 8:
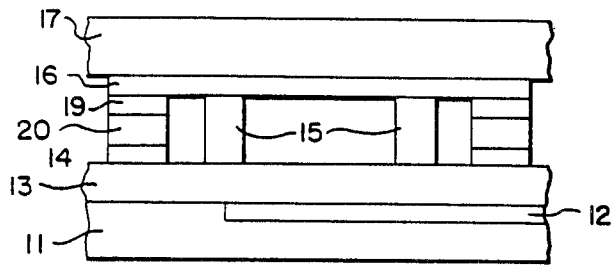
FIGS. 8 and 9 show the two field plate constructions joined.
Figure 9:
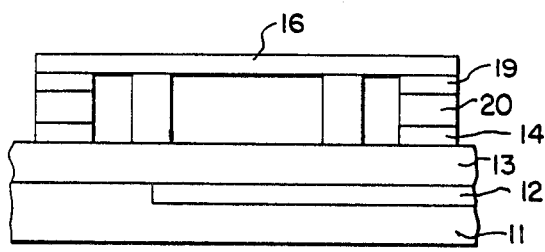

FIG. 8 shows the two halves, FIGS. 3 and 7, joined together. The solder is then reflowed securing the diaphragm 16 tight against stand-offs 15. The soluble substrate is then dissolved as shown in FIG. 9 and the solder is reflowed again to stretch the diaphragm. After substrate 17 is dissolved, diaphragm 16 has two exposed surfaces, one facing lower field plate 12 and one facing outwardly. The diaphragm now forms a capacitive acoustic transducer between itself and layer 12. Acoustic energy impinges upon the outwardly facing surface of field plate 16. First field plate 12 and second field plate 16 form a capacitor which will respond to this acoustic energy for providing a variable output. Contacts to first field plate 12 and to second field plate 16 can then be made for connecting the capacitive transducer to the electronic circuitry which may be integrated into substrate 11.

Figure 10:
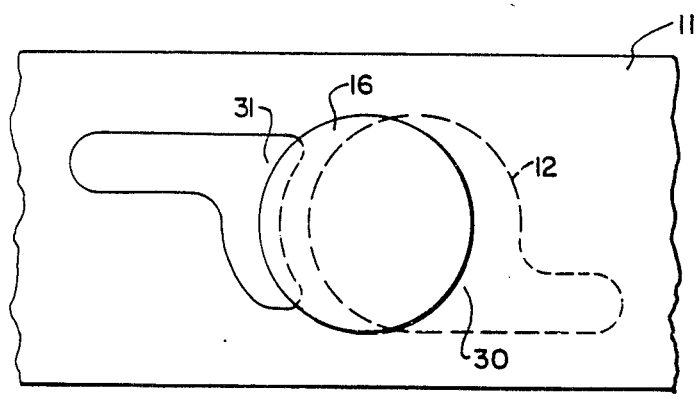
FIGS. 10 and 11 show the capacitive acoustic transducer in more detail.
Figure 11:
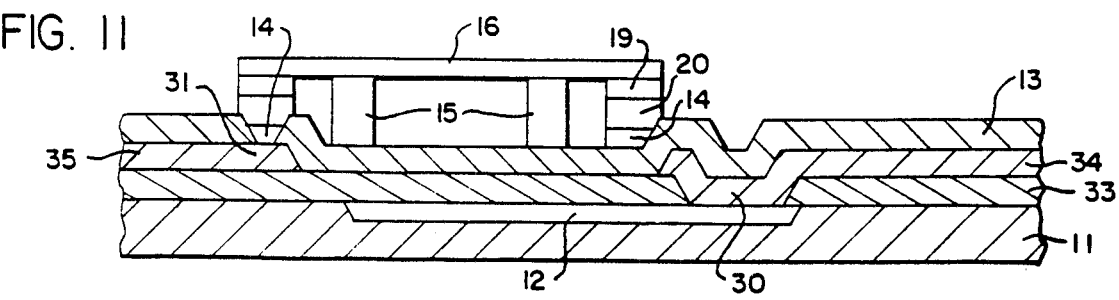

FIGS. 10 and 11 show the transducer in more detail. FIG. 10 shows a top view which includes substrate 11 having first field plate 12 suitably formed therein and second field plate 16 suitably mounted thereon. First contact 30 is provided within substrate 11 for making contact with first field plate 12 and second contact 31 is formed for providing electrical contact to second field plate 16.

Figure 1:
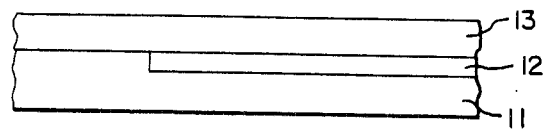
FIGS. 1-4 show the construction of the first field plate mounted on a semiconductor substrate.
Figure 2:
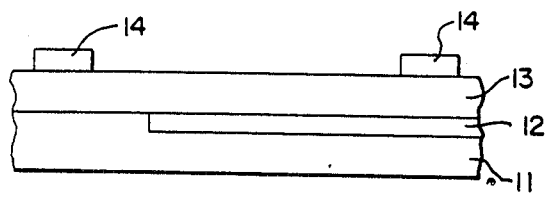

As shown in FIG. 11, first field plate 12 is suitably formed as by way of diffusion in semiconductor substrate 11. Substrate 11 is then coated with a silicon dioxide layer 33 as a result of normal semiconductor processing techniques. A hole is etched in layer 33 so that metallic layer 34 can be deposited over silicon dioxide layer 33 and make contact with first field plate 12 at contact point 30. Metallic layer 35 is also deposited over silicon dioxide layer 33. Passivation layer 13 is next formed over the metal and silicon dioxide layers as shown with a hole etched therein so that contact can be made at contact point 31 to metal layer 35. Pads 14 are then placed on the substrate structure as shown in FIG. 2. Stand-offs 15 are also formed as shown in FIG. 3.

Figure 6:
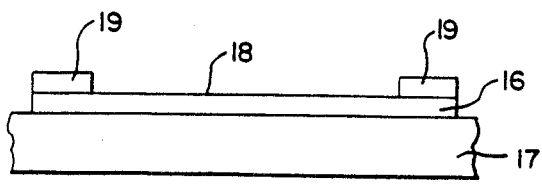

Next, the second field plate structure is formed as shown in FIGS. 5-7, flipped, and joined to the first field plate structure. The soluble salt is washed away, the solder reflowed and the diaphragm stretched.

Stand-offs 15 may be considered to be part of the contact means which may include pads 14, solder bumps 20 and wettable metal pads 19. Stand-off rings 15 may not be necessary if contact pads 14 and 19 and solder bumps 20 provide enough support for diaphragm 16. Metal leads 34 and 35 now provide the leads from the respective field plates 12 and 16 of the capacitive transducer.

Any variation in sound waves impinging upon diaphragm 16 will cause the capacitance between field plates 12 and 16 to vary changing the output signal on the leads 34 and 35.

The embodiments of the invention in which an exclusive property or right is claimed are defined as follows:

1. A method for fabricating a capacitive acoustic transducer comprising:
    forming a first field plate on a substrate structure;
    forming a second field plate on a disposable support structure;
    providing first and second contact means for respective connection to said first and second field plates;
    mounting said second field plate and disposable support structure to said substrate structure so that said first and second field plates form an acoustically responsive capacitor; and,
    disposing of said disposable support structure.

2. The method of claim 1 wherein said step of forming a second field plate on a disposable support structure comprises the step of forming said second field plate on a soluble salt.

3. The method of claim 2 wherein said step of forming a second field plate on a disposable support structure comprises the step of forming a second field plate having a non-solder wettable portion.

4. The method of claim 3 wherein said step of forming a second field plate having at least a non-solder wettable portion on a disposable support structure comprises the step of forming a second field plate having a portion which is solder wettable.

5. The method of claim 4 wherein said step of providing first and second contact means comprises the step of providing a solder bump on the solder wettable portion of said second field plate.

6. The method of claim 5 wherein said step of mounting said second field plate and said disposable support structure to said substrate structure comprises the step of providing stand-offs between said first and second field plates.

7. The method of claim 6 wherein said mounting step comprises the step of flowing the solder and stretching the second field plate.

8. The method of claim 7 wherein said step of providing first and second contact means comprises the step of providing at least one solder bump to said second field plate.

9. The method of claim 8 wherein said mounting step comprises the step of flowing said solder and stretching said diaphragm.

10. The method of claim 9 wherein said step of forming a second field plate on a disposable support structure comprises the step of forming a second field plate having a solder wettable portion and a solder non-wettable portion and wherein said solder bump is applied to said solder wettable portion.

* * * * *

UNITED STATES PATENT AND TRADEMARK OFFICE
CERTIFICATE OF CORRECTION

PATENT NO. : 4,610,062

DATED : September 9, 1986

INVENTOR(S) : Jon A. Roberts et al

It is certified that error appears in the above-identified patent and that said Letters Patent is hereby corrected as shown below:

In Column 4, line 42, delete "7" and substitute --1--.

Signed and Sealed this

Sixteenth Day of December, 1986

Attest:

DONALD J. QUIGG

Attesting Officer

Commissioner of Patents and Trademarks